United States Patent [19]

Tate

[11] 3,962,110

[45] June 8, 1976

[54] PROCESS AND COMPOSITION FOR PREVENTING SCALE BUILD-UP

[75] Inventor: Jack F. Tate, Houston, Tex.

[73] Assignee: Texaco Inc., New York, N.Y.

[22] Filed: Oct. 4, 1974

[21] Appl. No.: 511,973

Related U.S. Application Data

[63] Continuation-in-part of Ser. No. 82,186, Oct. 19, 1970, abandoned, and a continuation-in-part of Ser. No. 157,060, June 25, 1971, abandoned.

[52] U.S. Cl. .................................. 252/181; 210/58; 252/8.55 B; 252/180
[51] Int. Cl.$^2$ .................... C02B 5/02; C02B 5/06
[58] Field of Search ............... 252/8.55 B, 180, 181; 210/58

[56] References Cited
UNITED STATES PATENTS

| | | | |
|---|---|---|---|
| 1,405,783 | 9/1922 | Holle | 210/58 |
| 3,130,167 | 4/1964 | Green | 252/181 |
| 3,252,904 | 5/1966 | Carpenter | 252/8.55 |
| 3,400,078 | 9/1968 | Jones | 252/180 |
| 3,549,538 | 12/1970 | Jacklin | 252/180 X |

*Primary Examiner*—Herbert B. Guynn
*Attorney, Agent, or Firm*—T. H. Whaley; C. G. Ries; Walter D. Hunter

[57] ABSTRACT

A process and composition for the treatment of oil and gas wells to prevent and/or inhibit the build-up of an undesirable inorganic mineral scale deposits in which an aqueous solution of a vinylpyrrolidone polymer is employed in an amount sufficient to prevent and/or inhibit the development of such scale.

10 Claims, No Drawings

PROCESS AND COMPOSITION FOR PREVENTING SCALE BUILD-UP

CROSS REFERENCE TO COPENDING APPLICATION

This application is a continuation-in-part of commonly assigned application Ser. No. 82,186 filed Oct. 19, 1970, now abandoned, and of commonly assigned application Ser. No. 157,060, filed June 25, 1971, now abandoned.

FIELD OF THE INVENTION

This invention relates to a composition suitable for use in treating oil and gas wells and to a process utilizing such a composition. More particularly, this invention concerns a composition and process useful in the prevention and/or inhibition of the build-up of undesirable inorganic mineral scale deposits in oil and gas wells, their flow lines, auxiliary producing equipment such as pumps, heat exchangers, cooling towers, etc. as well as producing strata in the vicinity of the well bore.

DESCRIPTION OF PRIOR ART

The formation of objectionable mineral scale deposits such as calcium or barium sulfate is rather widespread in certain production areas, and has been attributed to several causes. One generally accepted theory of scale formation is that of chemical precipitation resulting from the commingling of two fluid streams each of which contains a concentration of a particular ion such that when they commingle an unstable water is produced. For example, in the case of calcium sulfate scale formation, one stream contains sulfate ions, and the other calcium ions in such concentration so as to produce an unstable water. The mixing of these streams at the well bore results in the precipitation of a hard crystalline calcium sulfate deposit which gradually builds up on the walls of the well tubing, for example, to a point where it would choke off fluid flow in the tube if remedial measures were not undertaken.

Another cause of scale formation is attributed to the precipitation of scale material from potentially supersaturated solution containing the same. When such solutions pass from the formation strata wherein temperatures and pressures are relatively high into the relatively low temperature, and pressure area at or about the well bore, precipitation of the salt on the tubing and surrounding strata occurs.

The use of strong alkali solutions for the removal of sulfate scale has been proposed. It has been claimed that under certain favorable conditions of temperature and time, concentrated alkali solutions will, in some cases, provide a build-up of the built-up scale after relatively long periods of treatment. If, for example, a calcium sulfate scale is treated with concentrated potassium hydroxide for comparatively long periods of time, say from 24 to 72 hours, it has been claimed that a white fluffy precipitate of calcium hydroxide will be formed. This deposit or precipitate may then be removed by suitable mechanical means. Such a method is obviously undesirable in that considerable periods of time are involved and the use of mechanical apparatus is expensive and in some cases, either undesirable or mechanically impossible. Moreover, strong alkali is not effective in preventing or inhibiting the build-up of scale deposits in well tubing, production equipment and the producing strata about the bore hole.

A principal object of this invention is to provide a process for inhibiting and/or preventing the buildup of inorganic mineral scale deposits in gas and oil flow lines, auxiliary equipment, well tubing and the surrounding subsurface strata.

A further object is to provide a scale treating composition for use in preventing the build-up of inorganic mineral scale deposits in the well tubing, producing equipment the bore hole and surrounding strata.

A still further object of this invention is to provide a process and composition for the treatment of gas and oil well tubing and the like containing inorganic mineral scale therein to prevent and/or inhibit the buildup of further scale deposits in the tubing.

SUMMARY OF THE INVENTION

This invention comprises a process for prevention and/or inhibiting scale build-up in an aqueous system which comprises incorporating in the aqueous system a scale treating composition comprising a water-soluble vinylpyrrolidone polymer in an amount sufficient to inhibit the development of scale in the aqueous system.

Another aspect of the invention includes a process for treating equipment susceptible to the development of scale deposits therein such as storage tank and the like, particularly oil field equipment using the scale prevention composition.

The invention is especially useful for preventing and/or inhibiting the build-up of scale comprising sulfate salts, such as calcium sulfate; barium salts, such barium sulfate; iron salts, etc. and mixtures thereof.

DETAILED DESCRIPTION OF THE INVENTION

Although water-soluble vinylpyrrolidone polymer having molecular weights ranging from about 10,000 to about 1,000,000 or more may be employed in the composition of the invention, it has been found that highly advantageous results are obtained when the molecular weight range is between about 100,000 and about 400,000. The sole limitation of the vinylpyrrolidone polymer is that it be sufficiently soluble in water. Likewise, it has been discovered that polyvinylpyrrolidone itself, or polyethylpyrrolidone as it is sometimes referred to, that is, the polymer of Formula I below where R, $R_a$, $R_b$, $R_c$ are each hydrogen, is an especially desirable polymer for use in the process of this invention. Mixtures of the above-described polymers may also be employed, if desired. The vinylpyrrolidone polymers mentioned above are readily soluble in cold water and show a high degree of compatibility (i.e., no reaction) in aqueous solutions with inorganic salts such as magnesium chloride, calcium chloride, barium chloride, sodium chloride, etc.

An especially valuable group of water-soluble vinylpyrrolidone polymers useful in the process of this invention have recurring units of the formula:

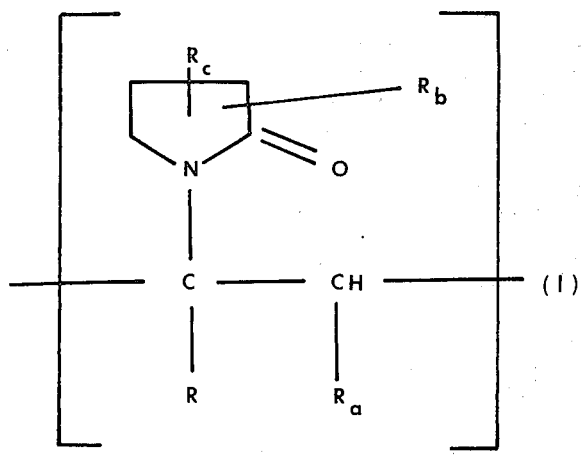

(I)

wherein R, $R_a$, $R_b$, and $R_c$ are independently selected from the group consisting of hydrogen and alkyl of from 1 to 5 inclusive carbon atoms as exemplified by methyl, ethyl, propyl, butyl, pentyl and isomeric forms thereof.

The preparation of vinylpyrrolidone monomers is described in Kirk-Othmer, *Encyclopedia of Chemical Technology*, Volume 1, Second Edition, Interscience Publishers, New York, 1963, page 205. Such monomers can be synthesized by reacting a carboxylic acid amide of the formula:

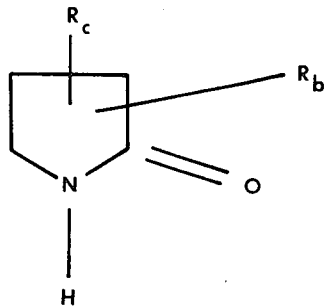

such as 2-pyrrolidone, 3-methyl-2-pyrrolidone, 4,4,-diethyl-2-pyrrolidone, 5-isobutyl-2-pyrrolidone, 4-methyl-2-pyrrolidone, 3-ethyl-2-pyrrolidone, 3-methyl-5-ethyl-2-pyrrolidone, etc. with acetylene or an acetylenic derivative of the formula:

wherein R and $R_a$ have the same meaning as previously described. Polymerization of the thus-derived monomers can be achieved by methods well-known in the art.

In carrying out one embodiment of the process of the invention the scale prevention composition is introduced into the equipment to be protected in an amount to provide the water-soluble vinylpyrrolidone polymer at a concentration sufficient to prevent and/or inhibit the development of scale deposits or additional scale deposits therein. Preferably, the scale prevention composition is circulated through the system to provide adequate contact of the composition with the surfaces to be protected. Underground strata surrounding the well bore can be treated in a like manner, i.e., by passing the solution down through the bore hole or production tubing, preferably under pressure.

The equipment to be protected or the well bore to be treated is contacted with the scale prevention compositions of this invention at ambient temperature although preferably the contacting temperature will be from about 40° to about 190°F and in all cases will be substantially below the boiling point of the treating compositions.

In general, it has been found that excellent protection against objectionable scale deposits can be obtained by maintaining the treating composition in contact with the oil field equipment continuously.

The scale prevention composition of this invention is used in an amount to provide the vinylpyrrolidone polymer in an amount of from about 0.0005 to about 0.02 percent by weight in an aqueous treating solution. It has been found that especially good results are obtained when the polyvinylpyrrolidone is present in concentration of from about 0.0005 to about 0.01 percent by weight. In areas containing appreciable amounts of scale deposits, the build-up of additional scale deposits therein is also inhibited or prevented by the use of the vinylpyrrolidone polymer at a concentration of about 0.0005 to about 0.01 percent by weight.

Amounts of the vinylpyrrolidone polymer at concentrations below about 0.0005 percent are generally ineffective because at such low concentrations inhibition of the scale is not readily obtained. Further, it has been discovered that higher concentrations (i.e., above about 0.02 percent) do not provide improved scale protection.

The treating composition can be prepared as a concentrated solution of the polymer in water with the solution being incorporated in the aqueous system to provide protection. One may also add the polymer with mixing directly to the aqueous system.

Preferably, an acidic aqueous solution of the vinylpyrrolidone polymer is employed in the process of this invention. Suitable acids include the non-oxidizing mineral acids, such as hydrochloric and sulfuric, which, when employed, are present in the solution in an amount up to about 30 percent by weight.

A more complete understanding of the invention will be obtained from the following illustrative examples.

The following procedure was used in the evaluations:

A 1,000 ml. glass beaker was provided with sufficient calcium sulfate and sodium chloride, obtained by mixing solutions of calcium chloride and sodium sulfate, to produce an aqueous concentration thereof of 10,000 parts per million of calcium sulfate and 50,000 parts per million of sodium chloride. A pre-weighed metal rotor attached to an externally provided mechanical stirring device was immersed in the test solution for a twenty hour time period during which time the solution was maintained at a temperature of 104°F. At the end of the 20 hours, the rotor was removed from the solution and from the stirrer, dried and reweighed.

The difference in weight of the rotor is taken as the amount of calcium sulfate scale deposit build-up expressed in grams of scale. Several tests were conducted on each material being evaluated and the average of the tests was taken as the amount of scale deposit. The above laboratory test procedure affords good correlation between the results thereby obtained and larger scale pilot evaluation of scale preventing compositions.

The following table records the results of the tests.

TABLE I

| Amount of Additive (PPM) | | Average Weight (grams) of Calcium Sulfate Developed After 24 hours at 104° | | |
|---|---|---|---|---|
| Example | Additive | 0 | 4.5 | 6.7 |
| Control | — | 1.00 | — | — |
| — | A* | — | 0.04 | 0.05 |

*Additive A - polyvinylpyrrolidone having an average molecular weight of 160,000, an intrinsic viscosity of 0.778, and R, $R_a$, $R_b$ and $R_c$ of Formula I are hydrogen atoms.

Inspection of the test results of the above table indicates that the compositions of this invention are effective calcium sulfate scale inhibitors at low concentrations.

Good results were obtained when the process of this invention was employed in treating wells in producing areas having a history of inorganic mineral scale deposits. A water injection well was treated with the scale inhibiting composition of this invention by introducing an acidified aqueous solution of polyvinylpyrrolidone of molecular weight 360,000 and at a concentration of 0.001 percent by weight into the well tubing and formation strata by means of a pump and afterwards shutting in the well for a period of about 30 hours. The acid was utilized to dissolve deposited scale whose composition was largely iron salts. The redeposition of such scale has been effectively prevented since injection pressure has not increased for 90 days. When the same treatment was carried out in the absence of the cited polymer, injection pressure became prohibitively high after 25 days.

As those skilled in the art will recognize, other modifications and variations of the hereinbefore described invention can be made without departing from the spirit and scope thereof.

What is claimed is:

1. A process for controlling the build-up of inorganic mineral scale deposits in an aqueous system which comprises incorporating in said system a composition consisting essentially of a water-soluble polyvinylpyrrolidone, the said polyvinylpyrrolidone being present in an amount sufficient to inhibit the development of scale, wherein the said polyvinylpyrrolidone comprises recurring units of the formula:

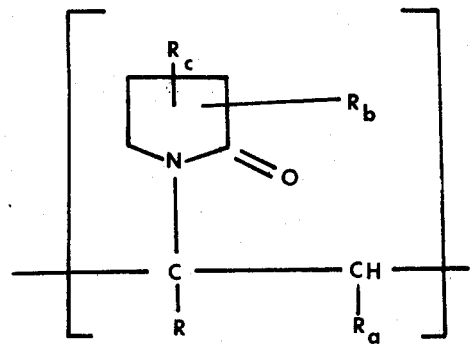

wherein R, $R_a$, $R_b$ and $R_c$ are independently selected from the group consisting of hydrogen and alkyl of from 1 to 5 inclusive carbon atoms, and the molecular weight of the said polyvinylpyrrolidone being from about 10,000 to about 1,000,000; and wherein the said system is made acidic through the addition of up to about 30 percent by weight of a non-oxidizing mineral acid.

2. The process of claim 1 wherein the said polyvinylpyrrolidone has a molecular weight of from about 100,000 to about 400,000.

3. The process of claim 1 wherein the said polyvinylpyrrolidone is present in said aqueous system in a concentration of from about 0.0005 to about 0.02 percent by weight.

4. The process of claim 1 wherein the said polyvinylpyrrolidone is present in said aqueous system in a concentration of from about 0.0005 to about 0.01 percent by weight.

5. The process of claim 1 wherein the said polyvinylpyrrolidone is present in said system in a concentration of from about 0.0005 to about 0.02 percent by weight and wherein the said system is made acidic through the addition of up to about 30 percent by weight of hydrochloric acid.

6. The process of claim 1 wherein the said inorganic mineral scale deposit is iron salt scale.

7. An inorganic mineral scale-inhibiting composition comprising an aqueous solution of polyvinylpyrrolidone having a molecular weight of from about 10,000 to about 1,000,000, the said polymer being present in an amount of from about 0.0005 to about 0.02 percent by weight and wherein the said solution is an acidic solution containing up to about 30 percent by weight of a non-oxidizing mineral acid.

8. The scale-inhibiting composition of claim 7 wherein the said polyvinylpyrrolidone polymer comprises recurring units of the formula:

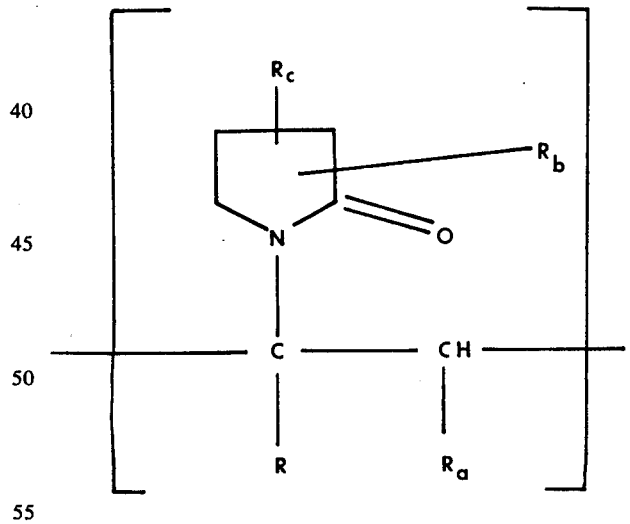

wherein R, $R_a$, $R_b$ and $R_c$ are independently selected from the group consisting of hydrogen and alkyl of from 1 to 5 inclusive carbon atoms.

9. The composition of claim 7 wherein the said polymer is polyvinylpyrrolidone having a molecular weight of from about 100,000 to about 400,000.

10. The composition of claim 7 wherein the said aqueous solution is an acidic aqueous solution containing up to about 30 percent by weight of hydrochloric acid.

* * * * *